April 12, 1927.　　　　G. ROUDANEZ　　　　1,624,563
BOLT LOCKING DEVICE
Filed Aug. 23, 1924
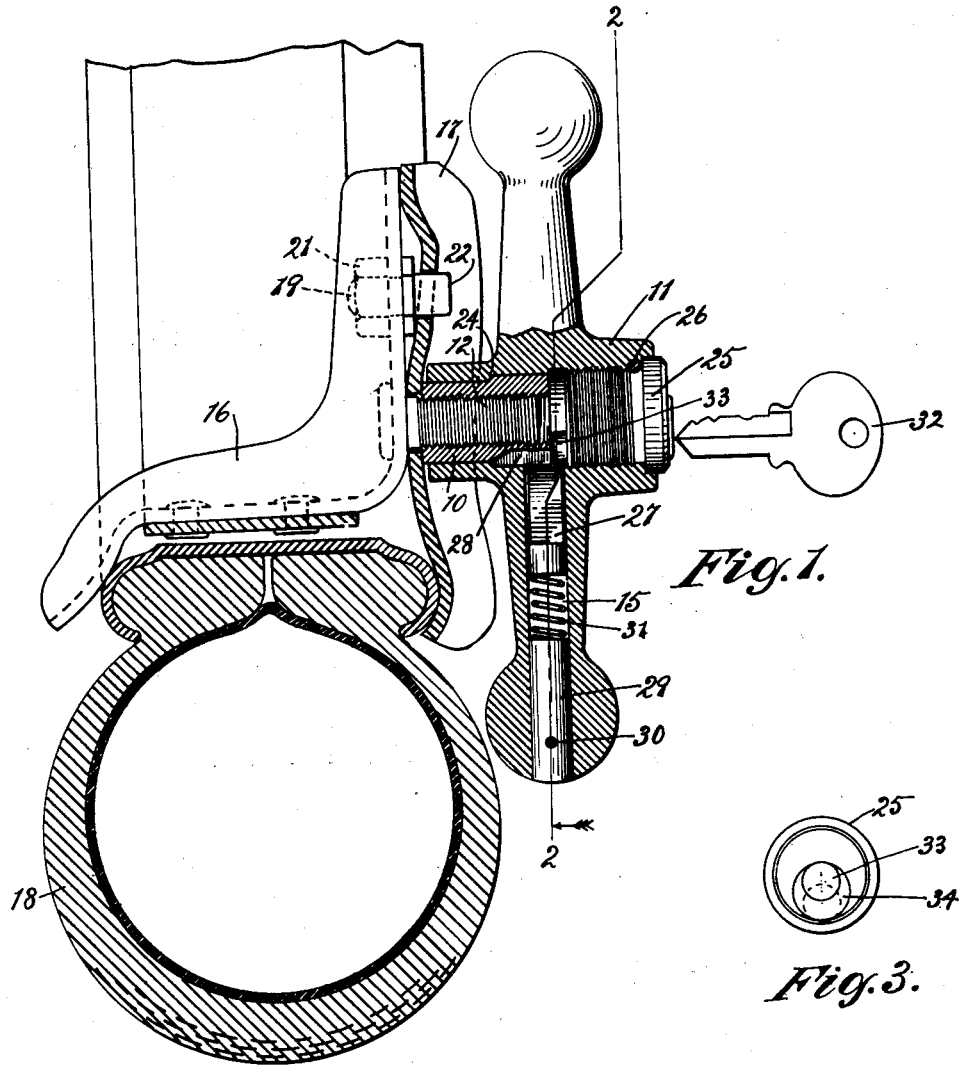
Fig.1.
Fig.3.
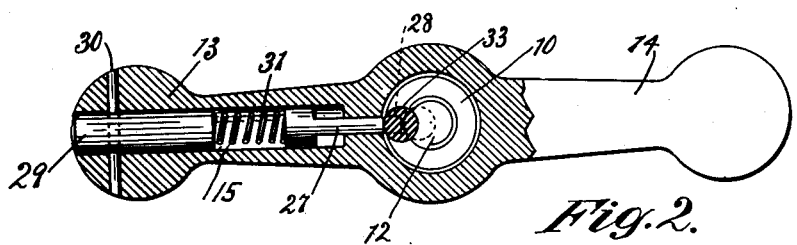
Fig.2.
Inventor:
Georges Roudanez
By Ernest E. Tupes
Atty.

Patented Apr. 12, 1927.

1,624,563

UNITED STATES PATENT OFFICE.

GEORGES ROUDANEZ, OF CHICAGO, ILLINOIS, ASSIGNOR, BY MESNE ASSIGNMENTS, TO LUCILLE J. ROUDANEZ, OF CHICAGO, ILLINOIS.

BOLT-LOCKING DEVICE.

Application filed August 23, 1924. Serial No. 733,722.

This invention relates to an improved locking device which is adapted for mounting on a bolt to prevent removal of the bolt from its mounting. More particularly it is adapted for use on bolts forming part of a device for locking extra tires or disc wheels in place on the automobile.

One of the objects of the invention is to provide a device of the class described which is adapted for threading on to a bolt so as to take the place of a nut and which cannot be removed by unauthorized persons.

Another object of the invention is to provide a locking device adapted for use with the fastening means of spare tires or extra wheels as they are usually carried on automobiles so as to insure against theft or loss.

A further object of the invention is to provide a locking device which is ornamental, easily operated and economical to manufacture.

Other further and more specific objects will become apparent as the specification proceeds.

In the accompanying drawing:—

Fig. 1 is a sectional view through the lower portion of a spare tire of a standard fastening device showing the preferred embodiment of the locking device mounted thereon.

Fig. 2 is a view along the line 2—2 of Fig. 1; and

Fig. 3 is an end view of a detail portion of the device.

The device is preferably adapted for mounting on a bolt with the nut removed although it can be satisfactorily used with a bolt having a nut in position thereon.

The invention resides in a device having an inner sleeve 10 adapted for threading over the projecting end of a bolt 12 and an outer element generally designated by the numeral 11 in which said sleeve is rotatably mounted. The element 11 is of a generally cylindrical shape, and is provided with arms 13 and 14 for convenience in operation, the arm 13 being provided with an aperture 15 for a purpose to be hereinafter described.

The device is shown as mounted on a well known type of tire holder comprising the members 16 and 17 which engage the lower section of a spare tire 18 in the usual manner. The bolt 12 projects through the members 16 and 17 a sufficient distance for proper mounting of the locking device thereon. The members 16 and 17 as usually constructed are provided with registering apertures above the bolt 12 for the purpose of fastening a padlock therein. I find it advantageous, when the members 16 and 17 have my locking device mounted thereon, to position a bolt 19 in the registering apertures to prevent any relative rotation of the members about the bolt 12. The bolt 19 is fastened to the member 16 by a nut 21 on the outer side and a ferrule 22 on the inner with the stem of the ferrule projecting through the member 17. While the device is shown as mounted on a tire holder it is understood that it is equally as well adapted for mounting on a disc wheel or any other article having a projecting bolt adapted to clamp two articles together when a nut is tightened down thereon.

In Fig. 1 the device is shown in position, with the sleeve 10 threaded onto the bolt 12 until the members 16 and 17 are clamped tightly together thereby preventing removal of the tire which is suspended in a well known manner from upper supports, not shown. The sleeve 10 fits closely within the element 11, the bearing faces being preferably finished for easy rotation of the element about the sleeve. A shoulder 24 is positioned to permit a slight projection of the sleeve 10 beyond the element 11 whereby the sleeve can be turned into close contact with the member 17 and leave a clearance between the element 11 and the member 17. A member 25 is mounted in the element 11 and extends inwardly leaving a substantial clearance between its inner end and the inner end of the sleeve 10, thereby permitting a limited amount of longitudinal motion of the sleeve relative to the element 11. The member 25 is threaded into position and fastened by a pin 26.

It is obvious that the device in the position shown is safely locked against removal as the element 11 can be rotated indefinitely about the sleeve 10 without turning the sleeve. Means are provided for fastening the sleeve 10 to the element 11 to cause the sleeve to rotate with the element. This means includes a plunger 27 mounted in the aperture 15 in the arm 13, and a longitudinally extending groove 28 formed in the outer periphery of the sleeve. A plug 29 is mounted in the outer end of the arm 13 and fastened by a pin 30. A spring 31 is positioned between the plug 29 and the plunger 27 to force the plunger into the groove 28 when the element 11 is rotated to bring the aperture 15 into register with the groove. This engagement of the plunger 27 with the sleeve 10 causes the sleeve to rotate with the element 11 and enables the device to be threaded on or off the bolt at will.

When the device is threaded onto the bolt 12 as shown in Fig. 1 it is locked in position on the bolt by removing the plunger from the groove 28 thereby permitting the element 11 to be rotated about the sleeve 10 without turning the sleeve. Removal of the plunger is accomplished by rotating a rod 34 which is journalled in the member 25 and operated by a key 32. A cam 33 is eccentrically mounted on the inner end of the rod 34 as best shown in Figs. 2 and 3. Rotation of the rod 34 by means of the key 32 to the position shown in Fig. 2 forces the plunger 27 out of the groove against the resilience of the spring 31. In this position the cam 33 holds the plunger out of engagement with the sleeve 10 and permits the element 11 to be rotated freely without moving the sleeve. Rotation of the rod 34 to bring the cam 33 to the position shown in Fig. 3 releases the plunger and permits it to engage the sleeve 10.

Thus it will be seen that the device provides novel means operable by a key or the like to prevent its removal from a bolt upon which it has been threaded, by permitting the accessible portion to be freely rotated about the interior threaded portion of the device. It also provides novel means operable by the key for connecting the exterior accessible portion with the interior unthreaded portion whereby the entire device can be threaded on or off the bolt as desired. Relative rotation of the standard clamping parts 16 and 17 is prevented by a novel device adapted to fit in registering apertures provided therein for insertion of a padlock in said clamping parts.

I claim:—

1. In a device of the class described, an interiorly threaded sleeve having a longitudinally extending groove exteriorly formed thereon, an element housing the sleeve and co-axially mounted therewith to permit relative rotation and limited longitudinal movement of the sleeve relative to the element, said sleeve projecting from the element at one end, stops limiting the amount of longitudinal movement of said sleeve to less than the maximum amount of its projection from said element and means operable to connect the sleeve with the element to prevent their independent rotation comprising a plunger mounted in the element, resilient means tending to force the plunger into said groove and key actuated means operable to disengage the plunger from said groove.

2. In a device of the class described, an interiorly threaded sleeve having a groove on its exterior portion, an element housing the sleeve and co-axially mounted therewith to permit of their relative rotation and limited longitudinal movement, means operable to connect the sleeve and element to prevent their independent rotation said means comprising a plunger mounted in the element and resilient means tending to force the plunger into said groove, and mechanism operable to disconnect the plunger from the groove comprising a cylindrical member mounted in said element opposite to and in axial alinement with said sleeve and stopping short of said sleeve, a key operated pin rotatably mounted in said cylindrical member and a cam on the inner end of said pin adapted to force and hold the plunger out of said groove and to act as a stop limiting the longitudinal movement of the sleeve.

Signed at Chicago, Ill., this 21st day of August, 1924.

GEORGES ROUDANEZ.